June 20, 1950  H. P. PHILLIPS  2,511,874
PISTON RING
Filed June 26, 1944

INVENTOR.
HAROLD P. PHILLIPS
BY Earl D. Chappell
ATTORNEYS.

Patented June 20, 1950

2,511,874

UNITED STATES PATENT OFFICE 2,511,874

PISTON RING

Harold P. Phillips, Hastings, Mich., assignor to Hastings Manufacturing Company, Hastings, Mich.

Application June 26, 1944, Serial No. 542,114

3 Claims. (Cl. 309—45)

The main objects of this invention are:

First, to provide a split resilient expansible cast iron piston ring having one or more relatively sharp cylinder contacting edges which is capable of resisting wear for a long period of time as compared to known cast iron piston rings having relatively sharp cylinder contacting edges.

Second, to provide a piston ring having a relatively sharp wear-resisting cylinder contacting edge which is economical to produce and may be used in various relations, that is, capable of use in various relations as oil drain rings and scraper rings.

Objects relating to details and economies of the invention will definitely appear from the description to follow. The invention is defined and pointed out in the claims.

Preferred embodiments of the invention are illustrated in the accompanying drawing, in which.

Figure 1:
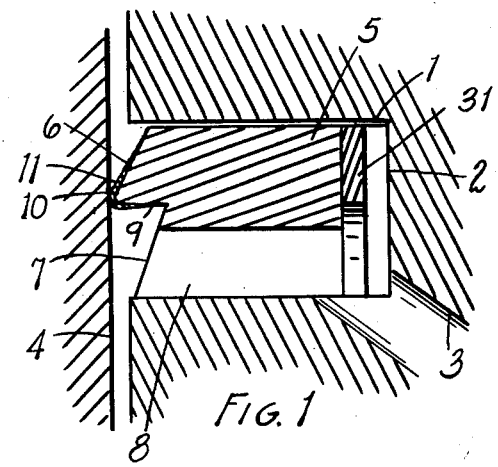
Fig. 1 is an enlarged fragmentary sectional view of a piston ring embodying the invention shown in association with a cylinder and in the oil ring groove of a piston.

In the accompanying drawing I have not attempted to show the parts in their relative proportions or the relative thickness of the plating on the cylinder contacting edge. The dimensions of the ring are much exaggerated in the drawing and the thickness of the plating is likewise exaggerated. No attempt has been made to show the clearances of the piston and the piston ring and their grooves in their proper proportions. It should be noted that while the cylinder contacting edge portions of the ring and the plating thereon are shown as having a substantial radius, they are in practice sharp, or relatively sharp; that is, the radius on the ring element is very small, commonly within the order of .003 to .015, .008 being a very satisfactory medium.

In the accompanying drawing 1 represents a piston having a piston ring groove 2 therein, this groove being the oil groove of the piston and provided with drain openings or passages 3. 4 represents the cylinder.

My improved piston ring 5 in the embodiment shown in Fig. 1 is provided with inclined peripheral faces 6 and 7 stepped relative to each other, drain openings 8 being provided in the under side of the ring and opening to the face 7 which in effect constitutes an oil collecting groove. The radial surface 9 meets the inclined surface 6 at an acute angle providing a relatively sharp edge 10 which, however, is formed with a slight radius, and in this embodiment is located centrally of the ring. This edge 10 is provided with a chrome plating 11 which laps onto both the inclined face and the meeting radial surface, thus providing a hard relatively sharp wear resisting cylinder contacting edge which remains sharp for a relatively long period of time. By forming the relatively sharp scraping edge of the ring with a slight arc the plating takes a substantially corresponding arc without a rough or feathered edge which is easily fractured.

Figure 2:
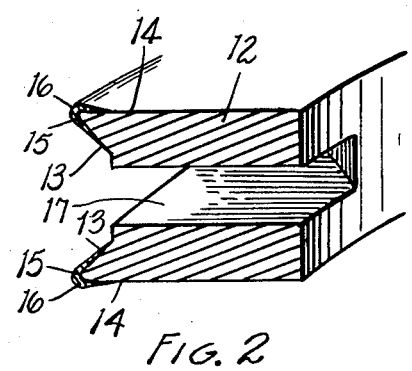
Fig. 2 is a fragmentary perspective view of a modified form or embodiment of my invention having two cylinder contacting edges as compared to the single contacting edge of the embodiment shown in Fig. 1.

In the embodiment of my invention shown in Fig. 2 the ring 12 is provided with two inwardly beveled or inclined surfaces 13 meeting the sides 14 of the ring and providing relatively sharp cylinder contacting edges 15 which are provided with chromium plating 16. In this structure, the drain openings 17 are positioned centrally of the ring.

Figure 3:
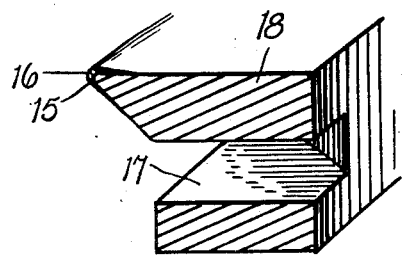
Fig. 3 is a fragmentary perspective view of a further modification or adaptation of my invention in which the cylinder contacting edge is in the upper corner of the ring.

In the embodiment of Fig. 3 the ring 18 has a single edge 15 provided with the chromium plating 16. The ring in Fig. 3 is the same as that of Fig. 2 with the exception that it has only one cylinder contacting edge.

Figure 4:
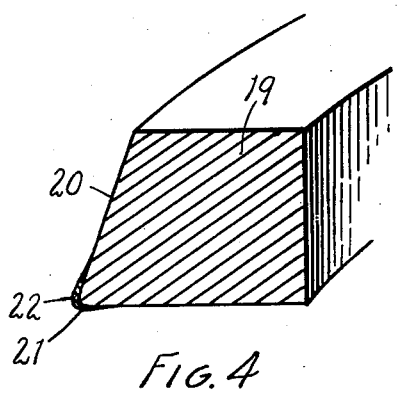
Fig. 4 is a fragmentary perspective view of another embodiment of my invention in which the cylinder contacting edge is at the lower corner of the ring, the ring being without oil drainage openings.

In the embodiment shown in Fig. 4 the ring 19 is provided with an inclined peripheral face 20 extending entirely across the ring and providing a peripheral cylinder wall edge 21 which is provided with a plating 22. This ring is designed for use as a scraper ring and is not provided with drain openings.

Figure 5:
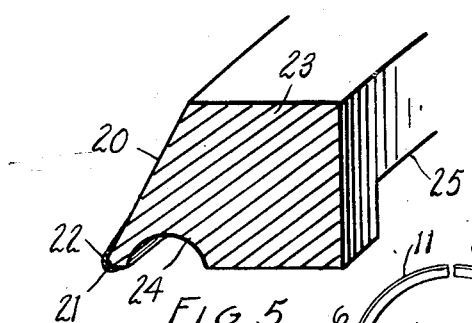
Fig. 5 is a fragmentary perspective view of a piston ring embodying my invention similar to that of Fig. 4 but having an undercut oil drain groove adjacent its cylinder contacting edge.

In the embodiment of the invention illustrated in Fig. 5 the ring 23 is the same as that of Fig. 4 with the exception that the lower face of the ring is provided with an annular groove 24 opening to the drain openings 25 which are located in the side of the ring in both embodiments.

Figure 6:
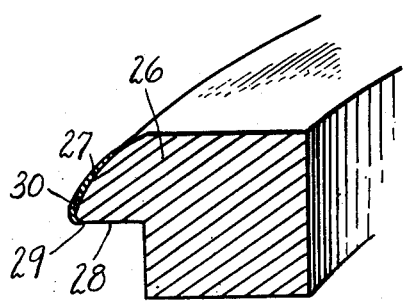
Fig. 6 is a fragmentary perspective view of still another form or embodiment of my invention in which the cylinder contacting edge is positioned intermediate the sides of the ring and substantially centrally relative thereto, the ring being without oil drainage openings.

In the embodiment of Fig. 6 the ring 26 has a curved peripheral surface 27 terminating in the annular radial wall 28 providing a scraping edge 29 having a plating 30 of wear-resisting material. This embodiment of the invention is also designed to be used as a scraper ring and is not provided with drain openings.

Figure 7:
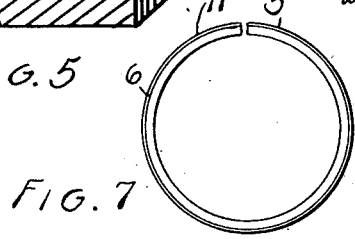
Fig. 7 is a side view of the embodiment of my invention shown in Fig. 1.

As illustrated in Fig. 7 my improved ring is of the split resilient expansible type, preferably formed of cast iron.

While I preferably use chromium as a plating for the cylinder wall scraping edge, platings of other hard wear-resisting materials may be used. The purpose of the plating is to provide a wear resisting cylinder contacting edge which will substantially prolong the life of the piston ring.

The efficiency of the piston ring for many purposes depends upon the unit pressure of the piston ring and this not only depends upon the surface of the cylinder contacting area of the ring but also on the inherent resilience of the ring which is sometimes augmented by expander rings 31. The unit pressure decreases as the cylinder wall contacting area of the ring increases, which increase is quite rapid in rings of cast iron initially having sharp cylinder wall contacting edges.

The life and efficiency of rings embodying my invention as compared to similar rings not embodying the invention is greatly prolonged. I have illustrated and described my improvements in embodiments which I consider highly desirable. I have not attempted to illustrate other adaptations as it is believed this disclosure will enable those skilled in the art to embody or adapt my invention as may be desired. As stated, I have not attempted to illustrate ring embodiments in exact proportions as these vary widely in commercial rings, nor have I attempted to show in the drawings the exact radius of the relatively sharp scraping edges of the ring or the plating thereon as it is not very practical to do so. However, very satisfactory results may be had even with a radius as slight as a .003 of an inch, although a radius of the order of .008 is more practical from a manufacturing standpoint and results in a smooth edged plating and one that can be easily produced without feathering or objectionable roughness. The cylinder contacting edge is in fact substantially sharp and it will be understood that I use the term "sharp" or "relatively sharp" in that sense.

Having thus described my invention what I claim as new and desire to secure by Letters Patent is:

1. A split resilient expansible cast iron piston ring having an axially inclined outer peripheral face terminating in a sharp slightly rounded cylinder wall contacting edge and having a radial surface meeting such edge and disposed at an acute angle to said peripheral face, the radius of the arc of curvature of said rounded edge being within the order of .003 to .015 of an inch, said edge being chrome plated, the chrome plating being of substantial thickness and extending around said rounded edge and to a substantial distance on the inclined face and lapping for a substantial distance said radial surface.

2. A split resilient expansible piston ring having a peripheral cylinder wall contacting scraper edge having an arc with a radius within the order of .003 to .015 of an inch, said edge, and substantial portions of adjacent surfaces, the meeting of which constitutes the edge, being chrome plated, the surfaces adjacent said edge being disposed at an acute angle to each other.

3. A split resilient expansible piston ring element having an annular relatively sharp and slightly rounded cylinder contacting edge, such edge and portions of adjacent surfaces, the meeting of which constitutes the edge, being chrome plated, said adjacent surfaces being disposed at an acute angle to each other.

HAROLD P. PHILLIPS.

REFERENCES CITED

The following references are of record in the file of this patent:

UNITED STATES PATENTS

| Number | Name | Date |
|---|---|---|
| 1,856,271 | Solenberger | May 3, 1932 |
| 1,956,014 | Fink | Apr. 24, 1934 |
| 2,169,613 | Niederlehner | Aug. 15, 1939 |
| 2,299,399 | Lane | Oct. 20, 1942 |
| 2,380,654 | Lane | July 31, 1945 |

FOREIGN PATENTS

| Number | Country | Date |
|---|---|---|
| 526,707 | Great Britain | Sept. 24, 1940 |
| 840,101 | France | Apr. 19, 1939 |